US011665285B2

(12) United States Patent
Lawson et al.

(10) Patent No.: US 11,665,285 B2
(45) Date of Patent: May 30, 2023

(54) TELEPHONY WEB EVENT SYSTEM AND METHOD

(71) Applicant: Twilio Inc., San Francisco, CA (US)

(72) Inventors: Jeffrey Lawson, San Francisco, CA (US); John Wolthuis, San Francisco, CA (US); Evan Cooke, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 73 days.

(21) Appl. No.: 17/301,335

(22) Filed: Mar. 31, 2021

(65) Prior Publication Data

US 2021/0218848 A1    Jul. 15, 2021

Related U.S. Application Data

(63) Continuation of application No. 16/557,001, filed on Aug. 30, 2019, now Pat. No. 11,005,998, which is a
(Continued)

(51) Int. Cl.
*H04M 7/00* (2006.01)
*H04L 12/66* (2006.01)
(Continued)

(52) U.S. Cl.
CPC .......... *H04M 7/0012* (2013.01); *H04L 12/66* (2013.01); *H04L 51/52* (2022.05); *H04L 67/02* (2013.01);
(Continued)

(58) Field of Classification Search
CPC ............ H04M 7/0012; H04M 3/2209; H04M 3/2218; H04M 7/006; H04M 15/00;
(Continued)

(56) References Cited

U.S. PATENT DOCUMENTS 5,274,700 A    12/1993  Gechter et al.
5,526,416 A     6/1996  Dezonno et al.
(Continued)

FOREIGN PATENT DOCUMENTS

CN    102227904 A    10/2011
DE    1684587 A1     3/1971
(Continued)

OTHER PUBLICATIONS

"Aepona's API Monetization Platform Wins Best of 4G Awards for Mobile Cloud Enabler", 4G World 2012 Conference & Expo, [Online]. [Accessed Nov. 5, 2015]. Retrieved from the Internet: <URL: https://www.realwire.com/releases/%20Aeponas-API-Monetization>, (Oct. 30, 2012), 4 pgs.
(Continued)

*Primary Examiner* — Brian T O Connor
(74) *Attorney, Agent, or Firm* — Schwegman Lundberg & Woessner, P.A.

(57) ABSTRACT

An embodiment of the system for publishing events of a telephony application to a client includes a call router that generates events from the telephony application and an event router that manages the publication of events generated by the call router and that manages the subscription to events by clients. The system can be used with a telephony application that interfaces with a telephony device and an application server.

20 Claims, 11 Drawing Sheets

Related U.S. Application Data continuation of application No. 16/241,746, filed on Jan. 7, 2019, now Pat. No. 10,455,094, which is a continuation of application No. 15/709,905, filed on Sep. 20, 2017, now Pat. No. 10,187,530, which is a continuation of application No. 15/193,416, filed on Jun. 27, 2016, now Pat. No. 9,807,244, which is a continuation of application No. 14/591,279, filed on Jan. 7, 2015, now Pat. No. 9,407,597, which is a continuation of application No. 12/572,258, filed on Oct. 1, 2009, now Pat. No. 8,964,726.

(60) Provisional application No. 61/102,007, filed on Oct. 1, 2008.

(51) Int. Cl.
*H04M 3/22* (2006.01)
*H04M 15/00* (2006.01)
*H04L 51/52* (2022.01)
*H04L 67/02* (2022.01)
*H04M 7/12* (2006.01)
*H04M 3/42* (2006.01)

(52) U.S. Cl.
CPC ....... *H04M 3/2209* (2013.01); *H04M 3/2218* (2013.01); *H04M 7/006* (2013.01); *H04M 15/00* (2013.01); *H04M 15/44* (2013.01); *H04M 15/90* (2013.01); *H04M 3/42229* (2013.01); *H04M 7/123* (2013.01); *H04M 7/128* (2013.01); *H04M 2215/0104* (2013.01); *H04M 2215/016* (2013.01); *H04M 2215/018* (2013.01)

(58) Field of Classification Search
CPC .. H04M 15/44; H04M 15/90; H04M 3/42229; H04M 7/123; H04M 7/128; H04M 2215/0104; H04M 2215/016; H04M 2215/018; H04L 12/66; H04L 51/52; H04L 67/02
See application file for complete search history.

(56) References Cited

U.S. PATENT DOCUMENTS

| | | |
|---|---|---|
| 5,581,608 A | 12/1996 | Jreij et al. |
| 5,598,457 A | 1/1997 | Foladare et al. |
| 5,867,495 A | 2/1999 | Elliott et al. |
| 5,934,181 A | 8/1999 | Adamczewski |
| 5,978,465 A | 11/1999 | Corduroy et al. |
| 6,026,440 A | 2/2000 | Shrader et al. |
| 6,034,946 A | 3/2000 | Roginsky et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,363,065 B1 | 3/2002 | Thornton et al. |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 * | 9/2002 | Shank ............... H04M 3/42153 379/265.09 |
| 6,459,913 B2 | 10/2002 | Cloutier |
| 6,463,414 B1 | 10/2002 | Su et al. |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,571,245 B2 | 5/2003 | Huang et al. |
| 6,574,216 B1 | 6/2003 | Farris et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,771,955 B2 | 8/2004 | Imura et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,772 B2 | 9/2004 | Bergman et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,928,469 B1 | 8/2005 | Duursma et al. |
| 6,931,405 B2 | 8/2005 | El-shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh et al. |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,981,041 B2 | 12/2005 | Araujo et al. |
| 6,985,862 B2 | 1/2006 | Strom et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,058,042 B2 | 6/2006 | Bontempi et al. |
| 7,058,181 B2 | 6/2006 | Wright et al. |
| 7,062,709 B2 | 6/2006 | Cheung |
| 7,065,637 B1 | 6/2006 | Nanja |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,099,442 B2 | 8/2006 | Da Palma et al. |
| 7,103,003 B2 | 9/2006 | Brueckheimer et al. |
| 7,103,171 B1 | 9/2006 | Annadata et al. |
| 7,106,844 B1 | 9/2006 | Holland |

(56) References Cited

U.S. PATENT DOCUMENTS

| | | |
|---|---|---|
| 7,111,163 B1 | 9/2006 | Haney |
| 7,133,518 B2 | 11/2006 | Sayko et al. |
| 7,136,932 B1 | 11/2006 | Schneider |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| D540,074 S | 4/2007 | Peters |
| 7,225,232 B2 | 5/2007 | Elberse |
| 7,227,849 B1 | 6/2007 | Rasanen |
| 7,245,611 B2 | 7/2007 | Narasimhan et al. |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,283,519 B2 | 10/2007 | Girard |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,370,329 B2 | 5/2008 | Kumar et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,461,263 B2 | 12/2008 | Prince |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,542,761 B2 | 6/2009 | Sarkar |
| 7,552,054 B1 | 6/2009 | Stifelman et al. |
| 7,571,226 B1 | 8/2009 | Partovi et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,275 B2 | 3/2010 | Yajnik et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,280 B2 | 3/2010 | Berry et al. |
| 7,685,298 B2 | 3/2010 | Day et al. |
| 7,715,547 B2 | 5/2010 | Ibbotson et al. |
| 7,716,293 B2 | 5/2010 | Kasuga et al. |
| 7,742,499 B1 | 6/2010 | Erskine et al. |
| 7,779,065 B2 | 8/2010 | Gupta et al. |
| 7,809,125 B2 | 10/2010 | Brunson et al. |
| 7,809,791 B2 | 10/2010 | Schwartz et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,949,111 B2 | 5/2011 | Harlow et al. |
| 7,962,644 B1 | 6/2011 | Ezerzer et al. |
| 7,979,555 B2 | 7/2011 | Rothstein et al. |
| 7,992,120 B1 | 8/2011 | Wang et al. |
| 8,023,425 B2 | 9/2011 | Raleigh |
| 8,024,785 B2 | 9/2011 | Andress et al. |
| 8,045,689 B2 | 10/2011 | Provenzale et al. |
| 8,046,378 B1 | 10/2011 | Zhuge et al. |
| 8,046,823 B1 | 10/2011 | Begen et al. |
| 8,069,096 B1 | 11/2011 | Ballaro et al. |
| 8,078,483 B1 | 12/2011 | Hirose et al. |
| 8,081,744 B2 | 12/2011 | Sylvain |
| 8,081,958 B2 | 12/2011 | Soderstrom et al. |
| 8,086,650 B1 | 12/2011 | Milford |
| 8,103,725 B2 | 1/2012 | Gupta et al. |
| 8,126,128 B1 | 2/2012 | Hicks, III et al. |
| 8,126,129 B1 | 2/2012 | Mcguire |
| 8,130,750 B2 | 3/2012 | Hester |
| 8,130,917 B2 | 3/2012 | Helbling et al. |
| 8,139,730 B2 | 3/2012 | Da Palma et al. |
| 8,145,212 B2 | 3/2012 | Lopresti et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,165,116 B2 | 4/2012 | Ku et al. |
| 8,166,185 B2 | 4/2012 | Samuel et al. |
| 8,169,936 B2 | 5/2012 | Koren et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,204,052 B2 * | 6/2012 | Baldwin ............. H04L 67/54 370/389 |
| 8,204,479 B2 | 6/2012 | Vendrow et al. |
| 8,214,868 B2 | 7/2012 | Hamilton et al. |
| 8,218,457 B2 | 7/2012 | Malhotra et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,301,117 B2 | 10/2012 | Keast et al. |
| 8,306,021 B2 | 11/2012 | Lawson et al. |
| 8,315,198 B2 | 11/2012 | Corneille et al. |
| 8,315,369 B2 | 11/2012 | Lawson et al. |
| 8,315,620 B1 | 11/2012 | Williamson et al. |
| 8,319,816 B1 | 11/2012 | Swanson et al. |
| 8,326,805 B1 | 12/2012 | Arous et al. |
| 8,335,852 B2 | 12/2012 | Hokimoto |
| 8,346,630 B1 | 1/2013 | Mckeown |
| 8,355,394 B2 | 1/2013 | Taylor et al. |
| 8,411,669 B2 | 4/2013 | Chen et al. |
| 8,413,247 B2 | 4/2013 | Hudls et al. |
| 8,417,817 B1 | 4/2013 | Jacobs |
| 8,429,827 B2 | 4/2013 | Wetzel |
| 8,438,315 B1 | 5/2013 | Tao et al. |
| 8,462,670 B2 | 6/2013 | Chien |
| 8,467,502 B2 | 6/2013 | Sureka et al. |
| 8,477,926 B2 | 7/2013 | Jasper et al. |
| 8,503,639 B2 | 8/2013 | Reding et al. |
| 8,503,650 B2 | 8/2013 | Reding et al. |
| 8,504,818 B2 | 8/2013 | Rao et al. |

(56) References Cited

U.S. PATENT DOCUMENTS

| | | |
|---|---|---|
| 8,509,068 B2 | 8/2013 | Begall et al. |
| 8,532,686 B2 | 9/2013 | Schmidt et al. |
| 8,533,857 B2 | 9/2013 | Tuchman et al. |
| 8,542,805 B2 | 9/2013 | Agranovsky et al. |
| 8,543,665 B2 | 9/2013 | Ansari et al. |
| 8,547,962 B2 | 10/2013 | Ramachandran et al. |
| 8,549,047 B2 | 10/2013 | Beechuk et al. |
| 8,549,639 B2 | 10/2013 | Newman et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,582,737 B2 | 11/2013 | Lawson et al. |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,621,598 B2 | 12/2013 | Lai et al. |
| 8,649,268 B2 | 2/2014 | Lawson et al. |
| 8,656,452 B2 | 2/2014 | Li et al. |
| 8,667,056 B1 | 3/2014 | Proulx et al. |
| 8,675,493 B2 | 3/2014 | Buddhikot et al. |
| 8,688,147 B2 | 4/2014 | Nguyen et al. |
| 8,695,077 B1 | 4/2014 | Gerhard et al. |
| 8,712,372 B2 | 4/2014 | Cesarini |
| 8,713,693 B2 | 4/2014 | Shanabrook et al. |
| 8,728,656 B2 | 5/2014 | Takahashi et al. |
| 8,751,801 B2 | 6/2014 | Harris et al. |
| 8,755,376 B2 | 6/2014 | Lawson et al. |
| 8,767,925 B2 | 7/2014 | Sureka et al. |
| 8,781,975 B2 | 7/2014 | Bennett et al. |
| 8,797,920 B2 | 8/2014 | Parreira |
| 8,806,024 B1 | 8/2014 | Toba Francis et al. |
| 8,819,133 B2 | 8/2014 | Wang |
| 8,825,746 B2 | 9/2014 | Ravichandran et al. |
| 8,837,465 B2 | 9/2014 | Lawson et al. |
| 8,838,707 B2 | 9/2014 | Lawson et al. |
| 8,843,596 B2 | 9/2014 | Goel et al. |
| 8,855,271 B2 | 10/2014 | Brock et al. |
| 8,861,510 B1 | 10/2014 | Fritz |
| 8,879,547 B2 | 11/2014 | Maes |
| 8,903,938 B2 | 12/2014 | Vermeulen et al. |
| 8,918,848 B2 | 12/2014 | Sharma et al. |
| 8,924,489 B2 | 12/2014 | Bleau et al. |
| 8,938,053 B2 | 1/2015 | Cooke et al. |
| 8,948,356 B2 | 2/2015 | Nowack et al. |
| 8,954,591 B2 | 2/2015 | Ganesan et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |
| 9,032,204 B2 | 5/2015 | Byrd et al. |
| 9,071,677 B2 | 6/2015 | Aggarwal et al. |
| 9,104,773 B2 | 8/2015 | Gandhi et al. |
| 9,137,127 B2 | 9/2015 | Nowack et al. |
| 9,141,682 B1 | 9/2015 | Adoc, Jr. et al. |
| 9,161,296 B2 | 10/2015 | Parsons et al. |
| 9,177,007 B2 | 11/2015 | Winters et al. |
| 9,204,281 B2 | 12/2015 | Ramprasad et al. |
| 9,210,275 B2 | 12/2015 | Lawson et al. |
| 9,306,982 B2 | 4/2016 | Lawson et al. |
| 9,307,094 B2 | 4/2016 | Nowack et al. |
| 9,325,624 B2 | 4/2016 | Malatack et al. |
| 9,338,190 B2 | 5/2016 | Eng et al. |
| 9,344,573 B2 | 5/2016 | Wolthuis et al. |
| 9,356,916 B2 | 5/2016 | Kravitz et al. |
| 9,378,337 B2 | 6/2016 | Kuhr |
| 9,390,418 B2 | 7/2016 | Gavan et al. |
| 9,398,622 B2 | 7/2016 | Lawson et al. |
| 9,407,597 B2 | 8/2016 | Lawson et al. |
| 9,456,008 B2 | 9/2016 | Lawson et al. |
| 9,456,339 B1 | 9/2016 | Hildner et al. |
| 9,460,169 B2 | 10/2016 | Hinton et al. |
| 9,553,940 B2 * | 1/2017 | Oh .......................... H04L 67/54 |
| 9,596,274 B2 | 3/2017 | Lawson et al. |
| 9,628,624 B2 | 4/2017 | Wolthuis et al. |
| 9,632,875 B2 | 4/2017 | Raichstein et al. |
| 9,634,995 B2 | 4/2017 | Binder |
| 9,807,244 B2 | 10/2017 | Lawson et al. |
| 10,187,530 B2 | 1/2019 | Lawson et al. |
| 10,455,094 B2 | 10/2019 | Lawson |
| 11,005,998 B2 | 5/2021 | Lawson et al. |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0025819 A1 | 2/2002 | Cetusic et al. |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0133587 A1 | 9/2002 | Ensel et al. |
| 2002/0136391 A1 | 9/2002 | Armstrong et al. |
| 2002/0165957 A1 | 11/2002 | Devoe et al. |
| 2002/0176378 A1 | 11/2002 | Hamilton et al. |
| 2002/0176404 A1 | 11/2002 | Girard |
| 2002/0184361 A1 | 12/2002 | Eden |
| 2002/0198941 A1 | 12/2002 | Gavrilescu et al. |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097330 A1 | 5/2003 | Hillmer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0149721 A1 | 8/2003 | Alfonso-nogueiro et al. |
| 2003/0162506 A1 | 8/2003 | Toshimitsu et al. |
| 2003/0195950 A1 | 10/2003 | Huang et al. |
| 2003/0195990 A1 | 10/2003 | Greenblat et al. |
| 2003/0196076 A1 | 10/2003 | Zabarski et al. |
| 2003/0204616 A1 | 10/2003 | Billhartz et al. |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Marfino et al. |
| 2004/0019676 A1 | 1/2004 | Iwatsuki et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da Palma et al. |
| 2004/0102182 A1 | 5/2004 | Reith et al. |
| 2004/0117788 A1 | 6/2004 | Karaoguz et al. |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0218748 A1 | 11/2004 | Fisher |
| 2004/0228469 A1 | 11/2004 | Andrews et al. |
| 2004/0236696 A1 | 11/2004 | Aoki et al. |
| 2004/0240649 A1 | 12/2004 | Goel |
| 2005/0005109 A1 | 1/2005 | Castaldi et al. |
| 2005/0005200 A1 | 1/2005 | Matenda et al. |

(56) References Cited

U.S. PATENT DOCUMENTS

| | | |
|---|---|---|
| 2005/0010483 A1 | 1/2005 | Ling |
| 2005/0015505 A1 | 1/2005 | Kruis et al. |
| 2005/0021626 A1 | 1/2005 | Prajapat et al. |
| 2005/0025303 A1 | 2/2005 | Hostetler, Jr. |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0083907 A1 | 4/2005 | Fishler |
| 2005/0091336 A1 | 4/2005 | Dehamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0283353 A1 | 12/2005 | Billingsley et al. |
| 2005/0286496 A1 | 12/2005 | Malhotra et al. |
| 2005/0289222 A1 | 12/2005 | Sahim |
| 2006/0008065 A1 | 1/2006 | Longman et al. |
| 2006/0008073 A1 | 1/2006 | Yoshizawa et al. |
| 2006/0008256 A1 | 1/2006 | Khedouri et al. |
| 2006/0015467 A1 | 1/2006 | Morken et al. |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0080415 A1 | 4/2006 | Tu |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168334 A1 | 7/2006 | Potti et al. |
| 2006/0203979 A1 | 9/2006 | Jennings |
| 2006/0209695 A1 | 9/2006 | Archer, Jr. et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0235715 A1 | 10/2006 | Abrams et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0043681 A1 | 2/2007 | Morgan et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0107048 A1 | 5/2007 | Halls et al. |
| 2007/0112574 A1 | 5/2007 | Greene |
| 2007/0116191 A1 | 5/2007 | Bermudez et al. |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Hokimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0092674 A1 | 4/2009 | Ingram et al. |
| 2009/0093250 A1 | 4/2009 | Jackson et al. |
| 2009/0094674 A1 | 4/2009 | Schwartz et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |

(56) References Cited

U.S. PATENT DOCUMENTS

| | | |
|---|---|---|
| 2009/0193433 A1 | 7/2009 | Maes |
| 2009/0216835 A1 | 8/2009 | Jain et al. |
| 2009/0217293 A1 | 8/2009 | Wolber et al. |
| 2009/0022131 A1 | 9/2009 | Chen et al. |
| 2009/0220057 A1 | 9/2009 | Waters |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0262725 A1 | 10/2009 | Chen et al. |
| 2009/0276771 A1 | 11/2009 | Nickolov et al. |
| 2009/0288012 A1 | 11/2009 | Hertel et al. |
| 2009/0288165 A1 | 11/2009 | Qiu et al. |
| 2009/0300165 A1 | 12/2009 | Tuckey et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0027531 A1 | 2/2010 | Kurashima |
| 2010/0037204 A1 | 2/2010 | Lin et al. |
| 2010/0054142 A1 | 3/2010 | Moiso et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0107222 A1 | 4/2010 | Glasser |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0029191 A1 | 11/2010 | Sanding et al. |
| 2010/0281108 A1 | 11/2010 | Cohen |
| 2010/0299437 A1 | 11/2010 | Moore |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0014981 A1 | 6/2011 | Koren et al. |
| 2011/0131293 A1 | 6/2011 | Mori |
| 2011/0138453 A1 | 6/2011 | Verma et al. |
| 2011/0143714 A1 | 6/2011 | Keast et al. |
| 2011/0145049 A1 | 6/2011 | Hertel et al. |
| 2011/0149950 A1 | 6/2011 | Petit-Huguenin et al. |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0179126 A1 | 7/2011 | Wetherell et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao et al. |
| 2011/0265168 A1 | 10/2011 | Lucovsky et al. |
| 2011/0265172 A1 | 10/2011 | Sharma |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0289162 A1 | 11/2011 | Furlong et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | Vanswol et al. |
| 2012/0089572 A1 | 4/2012 | Raichstein et al. |
| 2012/0094637 A1 | 4/2012 | Jeyaseelan et al. |
| 2012/0101952 A1 | 4/2012 | Raleigh et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0166488 A1 | 6/2012 | Kaushik et al. |
| 2012/0017361 A1 | 7/2012 | Bleau et al. |
| 2012/0170726 A1 | 7/2012 | Schwartz |
| 2012/0174095 A1 | 7/2012 | Natchadalingam et al. |
| 2012/0179646 A1 | 7/2012 | Hinton et al. |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0185561 A1 | 7/2012 | Klein et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0266258 A1 | 10/2012 | Tuchman et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0031613 A1 | 1/2013 | Shanabrook et al. |
| 2013/0036476 A1 | 2/2013 | Roever et al. |
| 2013/0047232 A1 | 2/2013 | Tuchman et al. |
| 2013/0054517 A1 | 2/2013 | Beechuk et al. |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |

(56) References Cited

U.S. PATENT DOCUMENTS

| | | |
|---|---|---|
| 2013/0110658 A1 | 5/2013 | Lyman |
| 2013/0132573 A1 | 5/2013 | Lindblom |
| 2013/0139148 A1 | 5/2013 | Berg et al. |
| 2013/0156024 A1 | 6/2013 | Burg |
| 2013/0166580 A1 | 6/2013 | Maharajh et al. |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0268676 A1 | 10/2013 | Martins et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0013400 A1 | 1/2014 | Warshavsky et al. |
| 2014/0025503 A1 | 1/2014 | Meyer et al. |
| 2014/0058806 A1 | 2/2014 | Guenette et al. |
| 2014/0064467 A1 | 3/2014 | Lawson et al. |
| 2014/0072115 A1 | 3/2014 | Makagon et al. |
| 2014/0073291 A1 | 3/2014 | Hildner et al. |
| 2014/0095627 A1 | 4/2014 | Romagnino |
| 2014/0101058 A1 | 4/2014 | Castel et al. |
| 2014/0101149 A1 | 4/2014 | Winters et al. |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0317640 A1 | 10/2014 | Harm et al. |
| 2014/0037251 A1 | 12/2014 | Fausak et al. |
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0127723 A1 | 5/2015 | Lawson et al. |
| 2015/0181631 A1 | 6/2015 | Lee et al. |
| 2015/0236905 A1 | 8/2015 | Bellan et al. |
| 2015/0281294 A1 | 10/2015 | Nur et al. |
| 2015/0365480 A1 | 12/2015 | Soto et al. |
| 2015/0370788 A1 | 12/2015 | Bareket et al. |
| 2015/0381580 A1 | 12/2015 | Graham, III et al. |
| 2016/0011758 A1 | 1/2016 | Dornbush et al. |
| 2016/0028695 A1 | 1/2016 | Binder |
| 2016/0077693 A1 | 3/2016 | Meyer et al. |
| 2016/0112475 A1 | 4/2016 | Lawson et al. |
| 2016/0112521 A1 | 4/2016 | Lawson et al. |
| 2016/0119291 A1 | 4/2016 | Zollinger et al. |
| 2016/0127254 A1 | 5/2016 | Kumar et al. |
| 2016/0149956 A1 | 5/2016 | Birnbaum et al. |
| 2016/0162172 A1 | 6/2016 | Rathod |
| 2016/0205519 A1 | 7/2016 | Patel et al. |
| 2016/0226937 A1 | 8/2016 | Patel et al. |
| 2016/0226979 A1 | 8/2016 | Lancaster et al. |
| 2016/0234391 A1 | 8/2016 | Wolthuis et al. |
| 2016/0239770 A1 | 8/2016 | Batabyal et al. |
| 2016/0309039 A1 | 10/2016 | Lawson et al. |
| 2017/0339283 A1 | 11/2017 | Chaudhary et al. |
| 2018/0013895 A1 | 1/2018 | Lawson et al. |
| 2019/0215401 A1 | 7/2019 | Lawson et al. |
| 2020/0076952 A1 | 3/2020 | Lawson et al. |
| 2021/0218846 A1 | 7/2021 | Lawson et al. |
| 2021/0218847 A1 | 7/2021 | Lawson et al. |

FOREIGN PATENT DOCUMENTS

| | | |
|---|---|---|
| EP | 0282126 A2 | 9/1988 |
| EP | 1464418 A1 | 10/2004 |
| EP | 1522922 A2 | 4/2005 |
| EP | 1770586 A1 | 4/2007 |
| EP | 2053869 A1 | 4/2009 |
| EP | 2335402 A1 | 6/2011 |
| ES | 2134107 A1 | 9/1999 |
| JP | 10294788 A | 11/1998 |
| JP | 2004166000 A | 6/2004 |
| JP | 2004220118 A | 8/2004 |
| JP | 2006319914 A | 11/2006 |
| WO | WO-9732448 A1 | 9/1997 |
| WO | WO-2002087804 A1 | 11/2002 |
| WO | WO-2006037492 A1 | 4/2006 |
| WO | WO-2009018489 A2 | 2/2009 |
| WO | WO-2009124223 A1 | 10/2009 |
| WO | WO-2010037064 A1 | 4/2010 |
| WO | WO-2010040010 A1 | 4/2010 |
| WO | WO-2010101935 A1 | 9/2010 |
| WO | WO-2011091085 A1 | 7/2011 |

OTHER PUBLICATIONS

"U.S. Appl. No. 12/572,258, Examiner Interview Summary dated Apr. 17, 2013", 4 pgs.

"U.S. Appl. No. 12/572,258, Examiner Interview Summary dated Jul. 16, 2014", 3 pgs.

"U.S. Appl. No. 12/572,258, Final Office Action dated Oct. 17, 2012", 30 pgs.

"U.S. Appl. No. 12/572,258, Non Final Office Action dated Jan. 20, 2012", 28 pgs.

"U.S. Appl. No. 12/572,258, Non Final Office Action dated Mar. 13, 2014", 30 pgs.

"U.S. Appl. No. 12/572,258, Notice of Allowance dated Oct. 7, 2014", 10 pgs.

"U.S. Appl. No. 12/572,258, Response filed Apr. 17, 2013 to Final Office Action dated Oct. 17, 2012", 11 pgs.

"U.S. Appl. No. 12/572,258, Response filed Jun. 19, 2012 to Non Final Office Action dated Jan. 20, 2012", 11 pgs.

"U.S. Appl. No. 12/572,258, Response filed Jul. 14, 2014 to Non Final Office Action dated Mar. 13, 2014", 9 pgs.

"U.S. Appl. No. 12/572,258, Supplemental Notice of Allowability dated Nov. 21, 2014", 3 pgs.

"U.S. Appl. No. 14/591,279, Final Office Action dated Feb. 26, 2016", 19 pgs.

"U.S. Appl. No. 14/591,279, Non Final Office Action dated Oct. 7, 2015", 20 pgs.

"U.S. Appl. No. 14/591,279, Notice of Allowance dated Apr. 13, 2016", 5 pgs.

"U.S. Appl. No. 14/591,279, Preliminary Amendment filed May 14, 2015", 8 pgs.

"U.S. Appl. No. 14/591,279, Response filed Jan. 25, 2016 to Non Final Office Action dated Oct. 7, 2015", 8 pgs.

"U.S. Appl. No. 14/591,279, Response filed Mar. 28, 2016 to Final Office Action dated Feb. 26, 2016", 8 pgs.

"U.S. Appl. No. 15/193,416, Final Office Action dated May 22, 2017", 9 pgs.

"U.S. Appl. No. 15/193,416, Non Final Office Action dated Dec. 29, 2016", 7 pgs.

"U.S. Appl. No. 15/193,416, Notice of Allowance dated Jun. 20, 2017", 5 pgs.

"U.S. Appl. No. 15/193,416, Notice of Allowance dated Sep. 27, 2017", 2 pgs.

(56) References Cited

OTHER PUBLICATIONS

"U.S. Appl. No. 15/193,416, Response filed Mar. 29, 2017 to Non Final Office Action dated Dec. 29, 2016", 6 pgs.
"U.S. Appl. No. 15/193,416, Response filed Jun. 2, 2017 to Final Office Action dated May 22, 2017", 5 pgs.
"U.S. Appl. No. 15/709,905, Non Final Office Action dated Apr. 11, 2018", 14 pgs.
"U.S. Appl. No. 15/709,905, Notice of Allowance dated Sep. 10, 2018", 9 pgs.
"U.S. Appl. No. 15/709,905, Response filed Jul. 23, 2018 to Non Final Office Action dated Apr. 11, 2018", 9 pgs.
"U.S. Appl. No. 16/241,746, Notice of Allowance dated May 31, 2019", 10 pgs.
"U.S. Appl. No. 16/241,746, Preliminary Amendment filed Apr. 1, 2019", 6 pgs.
"U.S. Appl. No. 16/557,001, Non Final Office Action dated Jul. 8, 2020", 14 pgs.
"U.S. Appl. No. 16/557,001, Notice of Allowance dated Jan. 13, 2021", 8 pgs.
"U.S. Appl. No. 16/557,001, Response filed Oct. 6, 2020 to Non Final Office Action dated Jul. 8, 2020", 12 pgs.
"Archive Microsoft Office 365 Email I Retain Unified Archiving", Gwava, Inc., Montreal, Canada, [Online] Retrieved from the Internet: <URL: http://www.gwava.com/Retain/Retain_for_Office_365.php>, (2015), 4 pgs.
"Complaint for Patent Infringement", *Telinit Technologies, LLC* v. *Twilio Inc* 2:12-cv-663, (Oct. 12, 2012), 17 pgs.
"Ethernet to Token Ring Bridge", Black Box Corporation, [Online] Retrieved from the Internet: <URL: http://blackboxcanada.com/resource/files/productdetails/17044.pdf>, (Oct. 1999), 2 pgs.
"European Application Serial No. 09818540.8, Extended European Search Report dated Mar. 21, 2013", 6 pgs.
"International Application Serial No. PCT/US2009/059300, International Preliminary Report on Patentability dated Apr. 14, 2011", 7 pgs.
"International Application Serial No. PCT/US2009/059300, International Search Report dated Jan. 11, 2010", 2 pgs.
"International Application Serial No. PCT/US2009/059300, Written Opinion dated Jan. 11, 2010", 5 pgs.
"Twilio Cloud Communications—APIs for Voice, VoIP, and Text Messaging", Twilio, [Online] Retrieved from the Internet: <URL: http://www.twilio.com/docs/api/rest/call-feedback>, (Jun. 24, 2015), 8 pgs.
Abu-Lebdeh, et al., "A 3GPP Evolved Packet Core-Based Architecture for QoS-Enabled Mobile Video Surveillance Applications", 2012 Third International Conference on the Network of the Future {NOF}, (Nov. 21-23, 2012), 1-6.

Barakovic, Sabina, et al., "Survey and Challenges of QoE Management Issues in Wireless Networks", Hindawi Publishing Corporation, (2012), 1-29.
Berners-Lee, T., "RFC 3986: Uniform Resource Identifier (URI): Generic Syntax", The Internet Society, [Online]. Retrieved from the Internet: <URL: http://tools.ietf.org/html/rfc3986>, (Jan. 2005), 57 pgs.
Kim, Hwa-Jong, et al., "In-Service Feedback QoE Framework", 2010 Third International Conference on Communication Theory. Reliability and Quality of Service, (2010), 135-138.
Matos, et al., "Quality of Experience-based Routing in Multi-Service Wireless Mesh Networks", Realizing Advanced Video Optimized Wireless Networks. IEEE, (2012), 7060-7065.
Mu, Mu, et al., "Quality Evaluation in Peer-to-Peer IPTV Services", Data Traffic and Monitoring Analysis, LNCS 7754, 302-319, (2013), 18 pgs.
Subramanya, et al., "Digital Signatures", IEEE Potentials, (Mar./Apr. 2006), 5-8.
Tran, et al., "User to User adaptive routing based on QoE", ICNS 2011: The Seventh International Conference on Networking and Services, (2011), 170-177.
U.S. Appl. No. 12/572,258 U.S. Pat. No. 8,964,726, filed Oct. 1, 2009, Telephony Web Event System and Method.
U.S. Appl. No. 14/591,279 U.S. Pat. No. 9,407,597, filed Jan. 7, 2015, Telephony Web Event System and Method.
U.S. Appl. No. 15/193,416 U.S. Pat. No. 9,807,244, filed Jun. 27, 2016, Telephony Web Event System and Method.
U.S. Appl. No. 15/709,905 U.S. Pat. No. 10,187,530, filed Sep. 20, 2017, Telephony Web Event System and Method.
U.S. Appl. No. 16/241,746 U.S. Pat. No. 10,455,094, filed Jan. 7, 2019, Telephony Web Event System and Method.
U.S. Appl. No. 16/557,001, filed Aug. 30, 2019, Telephony Web Event System and Method.
"U.S. Appl. No. 17/301,323, Non Final Office Action dated Aug. 4, 2022", 17 pgs.
"U.S. Appl. No. 17/301,330, Non Final Office Action dated Aug. 23, 2022", 15 pgs.
"U.S. Appl. No. 17/301,323, Examiner Interview Summary dated Nov. 21, 2022", 2 pgs.
"U.S. Appl. No. 17/301,330, Response filed Nov. 22, 2022 to Non Final Office Action dated Aug. 23, 2022", 9 pgs.
"U.S. Appl. No. 17/301,330, Examiner Interview Summary dated Nov. 22, 2022", 2 pgs.
"U.S. Appl. No. 17/301,323, Response filed Dec. 5, 2022 to Non Final Office Action dated Aug. 4, 2022", 11 pgs.
"U.S. Appl. No. 17/301,323, Notice of Allowance dated Dec. 16, 2022", 9 pgs.

\* cited by examiner

```
GET /foo.php HTTP/1.1
Host: demo.twilio.com
X-Twilio-CallGuid=DE870AD708ED70AE87D0AE7DAD7
X-Twilio-CallerId=415-555-1212
X-Twilio-NumberCalled=415-867-5309
X-Twilio-AccountId=AAF4AF5AF8A9A885449F7A647AF84
Content-Length: 0
```

FIGURE 8A

```
POST /foo.php HTTP/1.1
Host: demo.twilio.com
Content-Type: application/x-www-form-urlencoded
X-Twilio-CallGuid=DE870AD708ED70AE87D0AE7DAD7
X-Twilio-CallerId=415-555-1212
X-Twilio-NumberCalled=415-867-5309
X-Twilio-AccountId=AAF4AF5AF8A9A885449F7A647AF84
Content-Length: 11

Digits=1234
```

FIGURE 8B

```
GET /foo.php?digits=1234 HTTP/1.1
Host: demo.twilio.com
X-Twilio-CallGuid=DE870AD708ED70AE87D0AE7DAD7
X-Twilio-CallerId=415-555-1212
X-Twilio-NumberCalled=415-867-5309
X-Twilio-AccountId=AAF4AF5AF8A9A885449F7A647AF84
Content-Length: 0
```

FIGURE 8C

```
GET foo.php HTTP/1.1
Host: demo.twilio.com
X-Twilio-SMSid=DE870AD708ED70AE87D0AE7DAD7
X-Twilio-SMSSenderId=415-555-1234
X-Twilio-SMSShortCode=11111
X-Twilio-AccountId=AAF4AF5AF8A9A885449F7A647AF84
Content-Length: 0
```

FIGURE 8D

```
GET foo.php HTTP/1.1
Host: demo.twilio.com
X-Twilio-SMSid=DE870AD708ED70AE87D0AE7DAD7
X-Twilio-SMSSenderId=415-555-1234
X-Twilio-SMSShortCode=11111
X-Twilio-AccountId=AAF4AF5AF8A9A885449F7A647AF84
Content-Length: 21 message=statusrequest
```

FIGURE 8E

```
GET foo.php?message=statusrequest HTTP/1.1
Host: demo.twilio.com
X-Twilio-SMSid=DE870AD708ED70AE87D0AE7DAD7
X-Twilio-SMSSenderId=415-555-1234
X-Twilio-SMSShortCode=11111
X-Twilio-AccountId=AAF4AF5AF8A9A885449F7A647AF84
Content-Length: 0
```

FIGURE 8F

XML Response

```
<?xml version="1.0" encoding="UTF-8"?>
<Response>
        <Collect
                successUrl="http://www.example.com/phonetree.php"
                numDigits="1"
                timeout=20
        >
                <Say voice="female">
For sales press one. For support press two. For the operator, press three.
                </Say>
        </Collect>
</Response>
```

FIGURE 9A

XML Response

```
<?xml version="1.0" encoding="UTF-8"?>
<Response>
        <sms address=415-555-5555>
                thanks for the your text, will call at 5 PM.
        </sms>
        <CallAtTime="17:00PST">
                Today
                <Dial>415-555-5309</Dial>

</CallAtTime>
</Response>
```

FIGURE 9B

TELEPHONY WEB EVENT SYSTEM AND METHOD

CROSS-REFERENCE TO RELATED APPLICATIONS

This application is a continuation of U.S. patent application Ser. No. 16/557,001, filed on 30 Aug. 2019, which is a continuation of U.S. patent application Ser. No. 16/241,746, filed 7 Jan. 2019, which is a continuation of U.S. patent application Ser. No. 15/709,905, filed 20 Sep. 2017, which is a continuation of U.S. patent application Ser. No. 15/193,416, filed 27 Jun. 2016, which is a continuation of U.S. patent application Ser. No. 14/591,279, filed 7 Jan. 2015, which is a continuation of U.S. patent application Ser. No. 12/572,258, filed Oct. 1, 2009, which claims the benefit of U.S. Provisional Application No. 61/102,007 filed on Oct. 1, 2008, all of which are hereby incorporated in their entirety by this reference.

TECHNICAL FIELD

This invention relates generally to the event notification field, and more specifically to an new and useful system and method in the telephony web event field.

BACKGROUND

In recent years, there has been a growing trend of both internet-enabled phones and "websites as software". These two markets thrive on the transfer of information, instantaneous communication, and interaction between remote devices. However, current systems do not provide a seamless integration of telephony actions with remotely hosted applications, with server-side components, or with front-end websites. For instance, it is currently extremely difficult (if not impossible) to relay events that happen during a telephony call to or from a website securely in real-time during the telephony call. In addition, separation of business logic from telephony components complicates the transfer of realtime events from the call infrastructure to other remote services. Thus, there is a need in the telephony field to create a new and useful telephony web event system and method. This invention provides such a new and useful system and method.

BRIEF DESCRIPTION OF THE FIGURES

FIGS. 8A-8C are examples of a HTTP GET request, a HTTP POST request, and a HTTP GET request, respectively.
FIGS. 8D-8F are examples of a HTTP requests.
FIGS. 9A and 9B are examples of XML responses.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Telephony Web Event System

Figure 1:
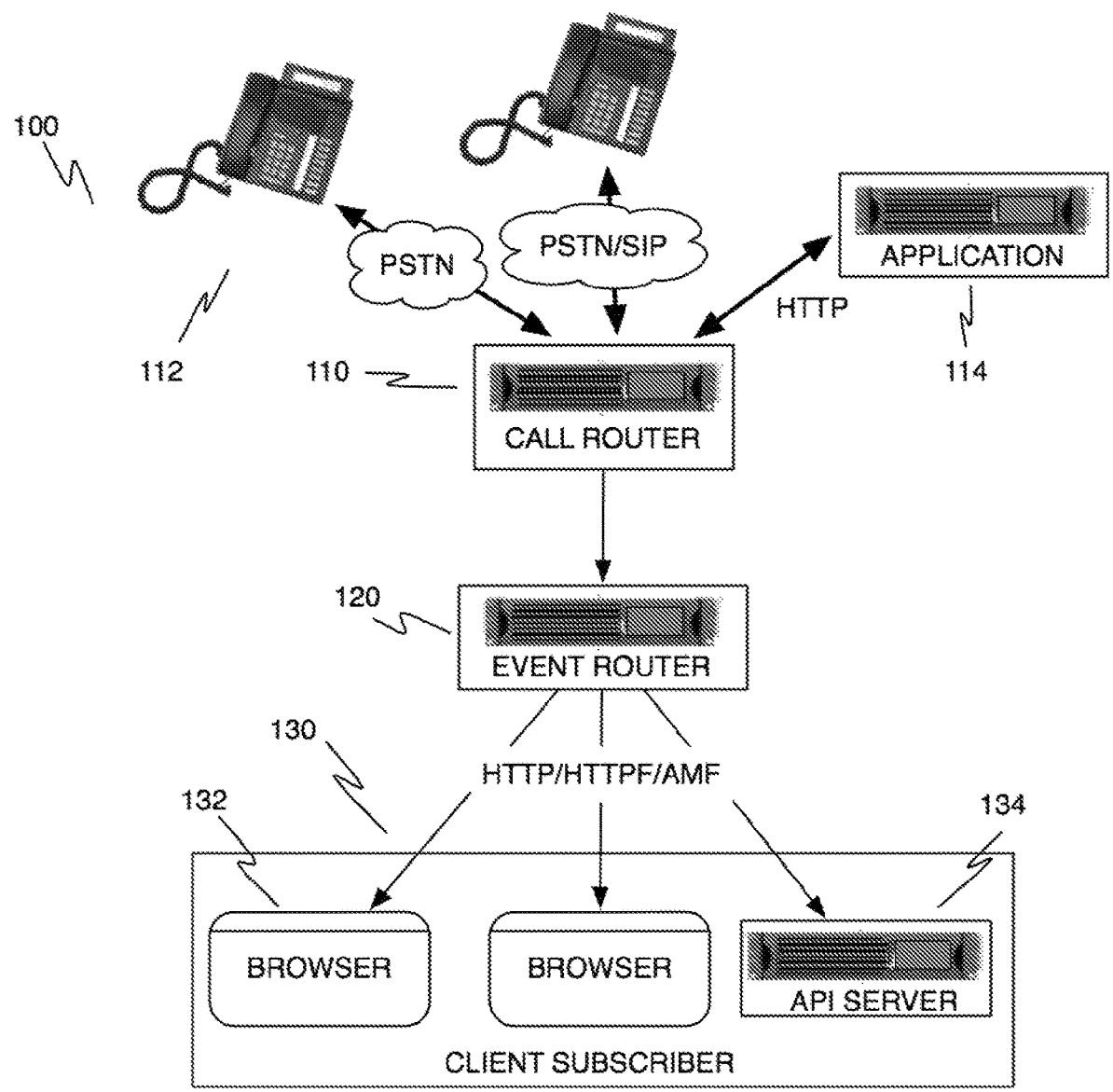
FIG. 1 is a schematic diagram of the preferred embodiment of the invention.
Figure 2:
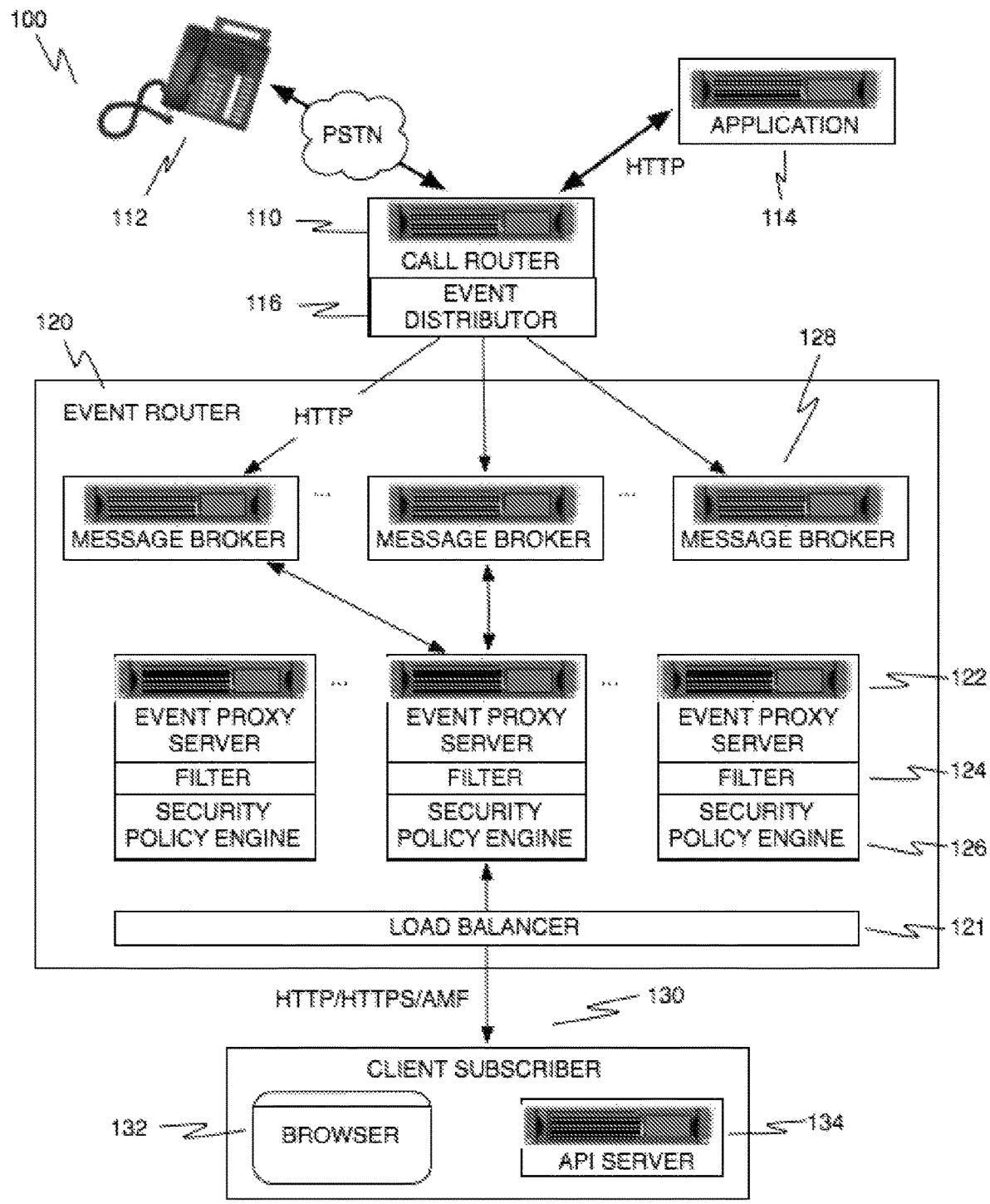
FIG. 2 is a detailed schematic diagram of the preferred embodiment of the invention.
Figure 3:
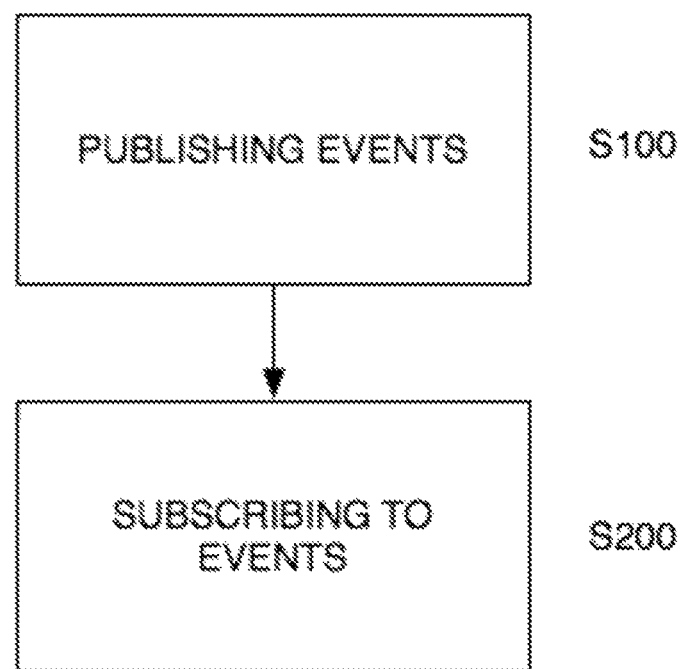
FIG. 3 is a flowchart diagram of a preferred method of event subscription for telephony applications.
Figure 4:
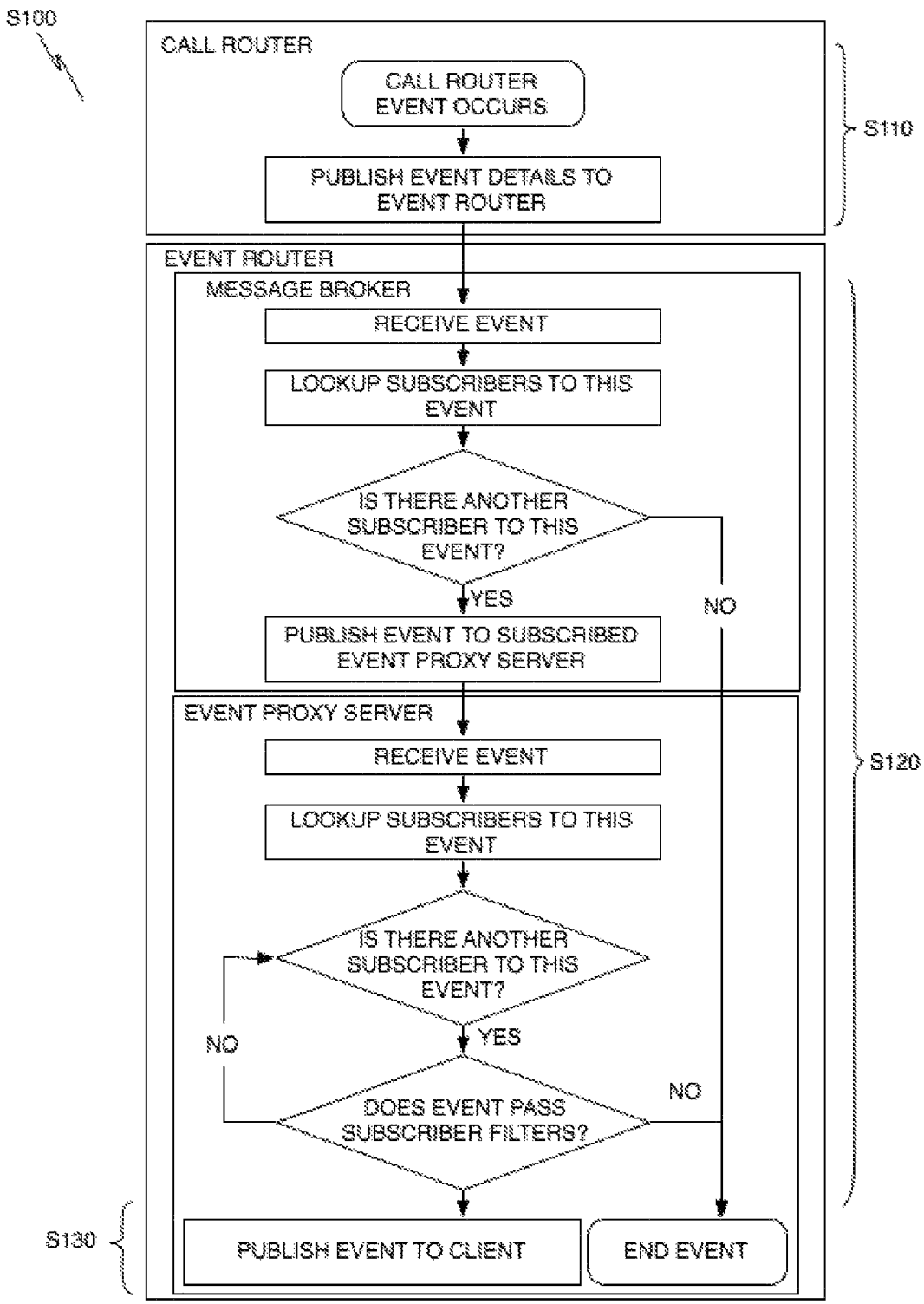
FIG. 4 is a flowchart diagram of a preferred method of distributing events.
Figure 5:
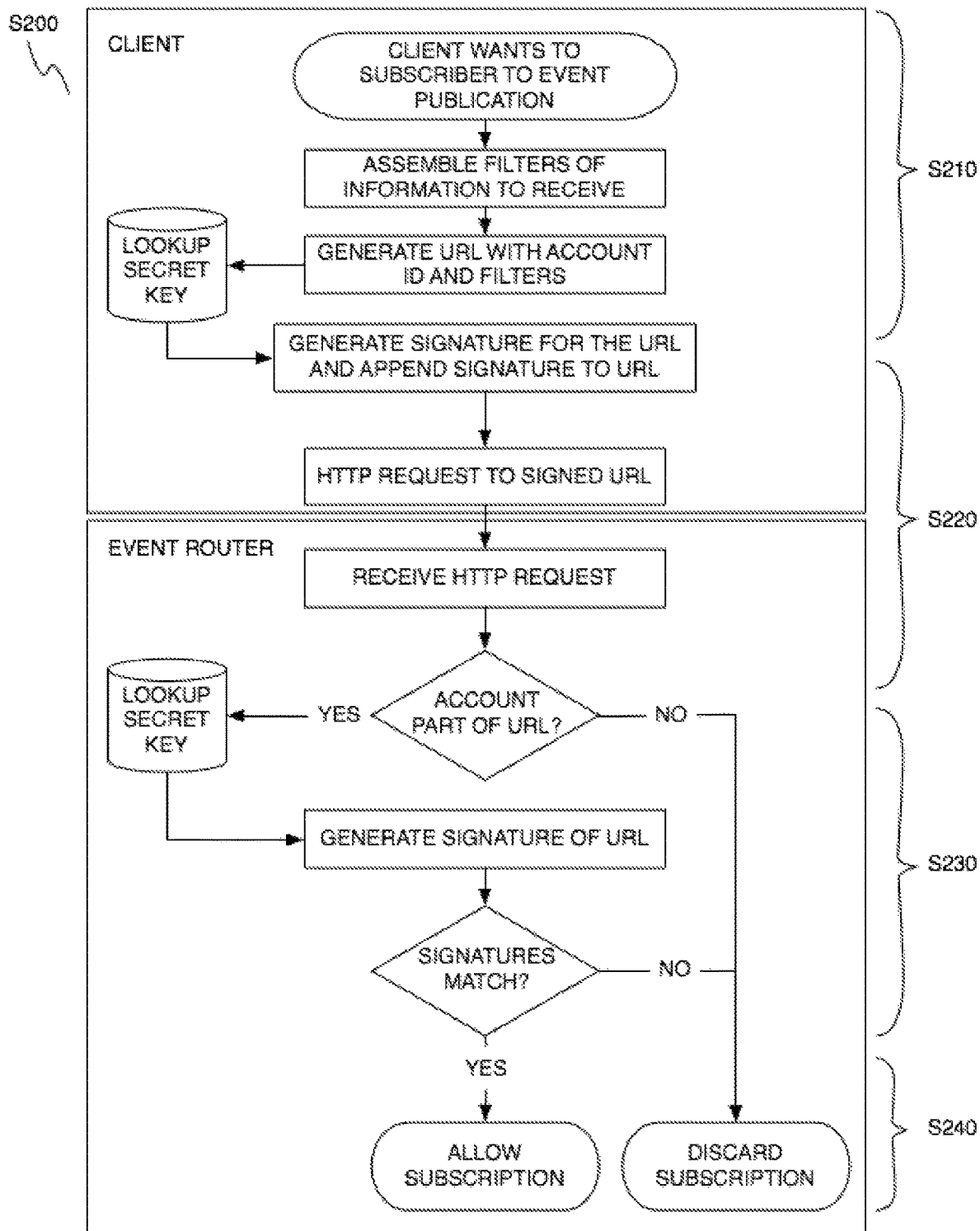
FIG. 5 is a flowchart diagram of a preferred method of subscribing to events.
Figure 6:
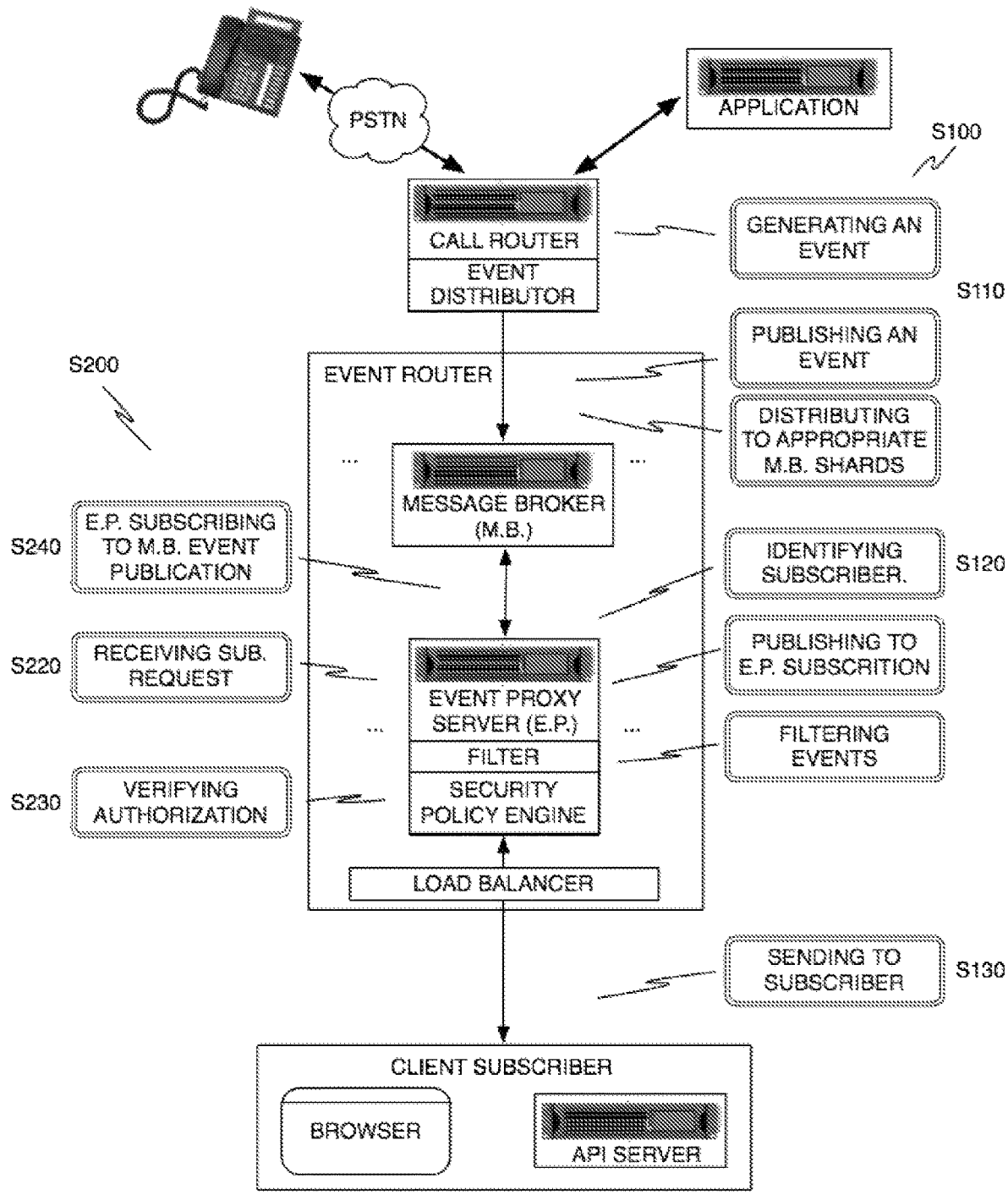
FIG. 6 is a flowchart diagram of a preferred method of subscribing and publishing events.

As shown in FIGS. 1 and 2, the telephony web event system 100 of the preferred embodiment includes a call router no and an event router 120. The system functions to enable real-time telephony event interaction. In the preferred system, telephony events (e.g., a dialing sequence, a speech command, and a phone call termination) are sent out by a publisher (a device that prepares and electronically announces the occurrence of an event, preferably a call router) and received by a subscriber. A subscriber is preferably any client 130, such as a web browser 132 or Application Programming Interface (API) server 134 that has permission to receive information concerning a particular event. The system 100 is preferably implemented on a multitennant system where a plurality of applications and users are handled on the same software or hardware system. In particular, the call router can preferably simultaneously manage a plurality of telephony application and the event router can publish a plurality of events and manage a plurality of subscriptions for a plurality of clients. The components of the system are preferably scalable with respect to the number of accounts, in-progress calls, events on those calls, and the number of client subscriptions. Call routers 110, event routers 120, or any sub-elements (such as event proxy servers 122 or message brokers 128) may be allocated or deallocated to automatically adjust for capacity requirements. A load balancer 121 may additionally be included to optimize the operation of the system components.

The call router 110 of the preferred embodiment functions to initiate the publication of events occurring during a telephony application. The telephony application is preferably a program controlling the interaction between a telephony based device 112 and an internet based web application server 114. The call router 110 preferably controls the call and program logic that enables telephony devices 112 to interface with the application server 114, as discussed in more detail below. The call router 110 preferably detects events occurring from the telephony application 114 and publishes these events to the event router 120. The call router may additionally include an event distributor 116 that determines to which event router to deliver the event. In one variation, the event router 120 includes a plurality of message brokers 128 that manage the publication of events. The message brokers 128 may be sharded or arranged according to event type or any suitable arrangement. The event distributor 116 preferably has control logic to know the correct message broker 128 to send an event. The control logic is preferably updated or synched with the scaling of hardware or software resources of the event router. As an example, an event may have varying attributes, such as account ID, a call ID, or event type. The message brokers 128 may be sharded based on any of these attributes or any combination of attributes. For example, if there are 3 event routers (shards), then the call router could convert the call ID into an integer and that number modulo 3 to determine which event router to contact. An event proxy server 122 may additionally share this control logic such that the event proxy server 122 knows which message broker(s) 128 to subscribe to. The event proxy server 122 preferably uses a similar technique to determine which event router 120 to contact based on what attributes where subscribed to. Additionally an event may be distributed (published) to multiple message brokers 128, such as in the situation where an event has attributes that are managed by multiple message brokers 128. For example, the event may be published by one message broker 128 that manages publication of events for a particular account and the event may additionally be published by a second message broker 128 that manages publication of events of a particular event type. Additionally, multiple event distributor 116 may be allocated or deallocated. The call router and the event router preferably communicate using HTTP or alternatively HTTPS, though any suitable communication system may be used. The published event preferably includes the account to which the event belongs, the type of event, and optionally a set of event data related to the event.

The call router 110 of the preferred embodiment additionally functions to initiate or receive calls from the telephony device 112 and connect to a web-application server 114. The call router 110 is substantially similar to the call router disclosed in application Ser. No. 12/417,630 filed on 2 Apr. 2009 and entitled "System and Method for Processing Telephony Sessions" which is hereby incorporated in its entirety by this reference. The call router 110 is preferably connected to a PSTN device over the PSTN network, such that it can receive and make calls from PSTN-connected devices 112, such as landlines, cellular phones, satellite phones, or any other suitable PSTN-connected devices, as well as non-PSTN devices, such as Voice-Over-Internet-Protocol (VOIP) phones, SIP devices, Skype, Gtalk, or other Internet addressable voice devices. The call router 110 may alternatively or additionally function as or include a message router for use with message-based networks such as SMS, email, faxes, instant messaging, or micro-blogging networks. The call router 110 can preferably connect to an SMS network, such that it can receive and send messages from SMS network devices 112, cellular phones, computers, smart phones, or any suitable SMS network devices. The call router 110 may also send or receive text messages, multimedia messages, emails, faxes and other suitable PSTN-compatible communication messages. The call router 110 can preferably connect to an instance messaging network, such that the call router 110 can receive and send messages and receive and transmit presence information from different instance messages networks such as those based on protocols like Jabber, AIM, or fax. The call router 110 can preferably connect to micro-blogging networks such as Twitter such that it can receive and send messages to and from micro-blogging networks via APIs exposed by those networks. The call router 110 may alternatively send and receive message from any suitable system with exposed APIs. The call router 110 preferably communicates with the application server 114 using an application layer protocol, more preferably using the HTTP, or secure HTTPS, protocol. The communication between the application server 114 and the call router 110 is preferably stateless and any state information (e.g., call state) or data is preferably located in a URI or the request parameters, such as HTTP headers, GET URI parameters, POST request body parameters, or HTTP cookies. Available state information is preferably transmitted by call router requests to the application server for stateless processing, and the application server preferably stores no state. Alternatively, the application server preferably stores local state information, such as databases or sessions, as is common in web development. The call router no preferably stores state information in call router resources 29. The call router resources are preferably accessible by the application server 114 and other devices through a call router API. The call router 110 preferably associates each incoming phone number with a starting resource address (or more specifically a URI), more preferably the URI is provided by the application server 114, still more preferably the URI is provided by the application developer before a call is received at the call router 110 by associating the initial URI with the incoming call address (such as DID, SIP address, etc.) or by the application upon initiation of an outgoing call. The call router 110 preferably sends call data such as the caller number (obtained via Caller ID), caller geographic data (country, city, and/or state, zip), the number dialed, the time of the call, or any other suitable information or parameter. The call data is preferably digitally signed with a secret key stored on the call router 110. A cryptographic hash of the information is preferably included along with the information as a digital signature. The call router 110 may also encrypt sensitive information (either before or after the cryptographic hash is computed) using the secret key to allow sensitive information to be sent across the network. The call data is preferably sent as an HTTP POST request to the application server 114. Call data may also be sent in URL (GET) variables, or encapsulated in HTTP headers. An example HTTP request containing the information in the header as shown in FIGS. 8A and 8D. As shown in FIG. 8B, further inputs (such as voice recording or DTMF button pressing) from the PSTN-device may be subsequently submitted to the application server 114 as HTTP requests (GET or POST). As shown in FIG. 8C, the inputs from a phone keypad may be included in an HTTP GET request. As shown in FIG. 8E, the content of an SMS message received by the call router may be sent to the application server 114 as an HTTP request. As shown in FIG. 8F, the inputs from the text message are included in an HTTP GET request. The request data may alternatively be simultaneously sent in the URI (query string), message body (POST) and message headers, or any combination of the above.

Any suitable action or parameter, either initiated by the telephony device 112 or by the application server 114, may constitute an event generated by the call router 110. The call router 110 preferably automatically detects such events through any suitable program logic. Events may relate to call related events such as starting or ending a call, starting or ending dialing a number, or any call based occurrence. The events may additionally or alternatively be related to telephony actions such as starting or stopping recording audio, starting or stopping a Text-To-Speech (TTS) conversion, starting or stopping the playing of an audio file, beginning or stopping the gathering of telephony input, redirecting the call to another phone number, or any telephony based instruction. Events may additionally be adjusted for particular applications such as conference calls. Conference call events might include a participant joining a call, a participant leaving a call, gathering telephony input, participant muted, participant unmated, or any suitable conference based event. Furthermore, events may be generated for actions that occur on the message-based protocols used by the call router 110. For example, an messaging events might include a message sent, message received, and message error for SMS, email, faxes, instant messaging, or micro-blogging messages.

The event router 120 of the preferred embodiment functions to connect published events with subscribers of the event. Preferably, the published event is pushed to subscribers through an open HTTP connection (a single continuous HTTP connection). The open HTTP connection functions to simplify software of a web application using the system.

Alternatively, the connection may push data with HTTPS, intermittent HTTP/HTTPS connections, AMF Channel, TCP connection, UDP connection, chat protocols such as jabber, or any suitable messaging framework. The event router is preferably a server, which may be partitioned and scaled for greater capacity. The event router 120 may alternatively be a monolithic system or any suitable software or hardware device(s) for routing events between any number of event publishers and authorized subscribers. In one preferred embodiment, the event router includes an event proxy server 122 and/or a message broker 128. The event proxy server 122 preferably manages the subscriptions from a client (i.e., subscriber) and/or performs more computational intensive processes like filtering events and security. The message broker 128 preferably manages the publications and more preferably manages a subset of event publications from the call router. The event proxy server 122 is preferably part of a cluster of event proxy servers 122 that can be dynamically scaled to satisfy capacity requirements. The message broker 128 is preferably part of a cluster of message brokers 128 that can similarly be dynamically scaled to satisfy capacity requirements. A load balancer may additionally be included within the event router 120 to manage the capacity load of the various components (e.g., the event proxy servers 122 and the message brokers 128). A plurality of load balancers may be individually implemented for each component type, or a single load balancer may manage the event router 120.

The message broker 128 of the event router 120 functions to manage the publication of events. The message broker 116 (or core message distributor) preferably handles routing of events to be published. A message broker is preferably any message broker as is known in the art such as RabbitMQ or other Advanced Message Queuing Protocol (AMQP) based broker. Preferably, a plurality of message brokers 128 is used to manage the events. More preferably message brokers 128 are sharded (i.e., partitioned) according to dedicated event types (or group of event types). Events are preferably distributed to the appropriate message broker 128 based on the event type. The sharding of message brokers may alternatively be according to any suitable rule. The message brokers 128 (i.e., the shards) may additionally be hosted on different hardware or software platforms, and event type responsibilities may be adjusted when additional message brokers 128 are allocated or deallocated from the cluster of message brokers 128. The message broker 128 may alternatively be a single device for all published events or hosted on a single system. A message broker 128 preferably sends events to an event proxy server 122 that is subscribed to a particular event. A message broker 128 may additionally send an event for any number of subscriptions, where the subscriptions are managed by any suitable number of event proxy servers 122.

Figure 10:
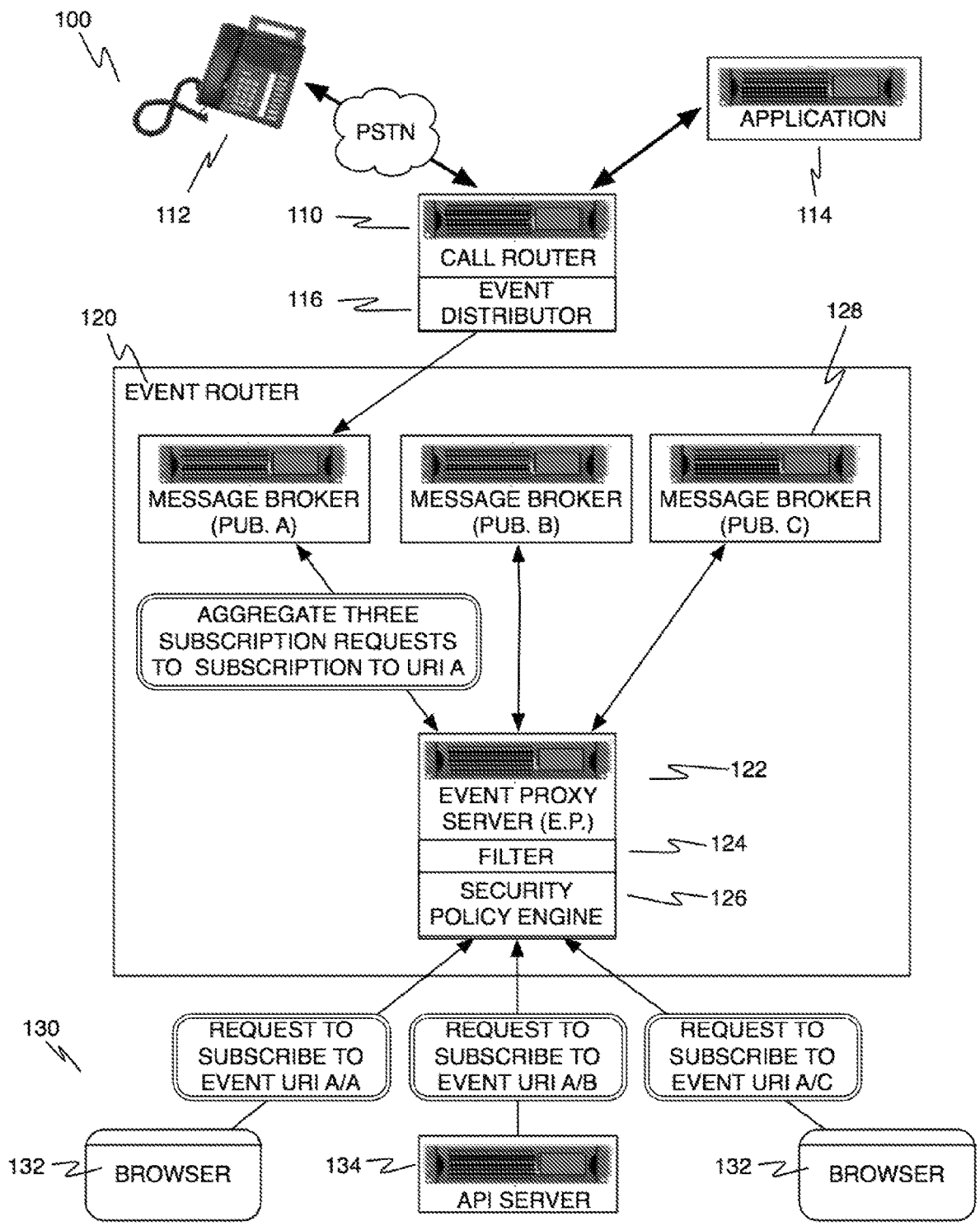
FIG. 10 an example of subscription aggregation.

The event proxy server 122 of the event router 120 functions to manage the subscriptions of clients. The client preferably connects to the event proxy server 122 for establishing a subscription to an event and to receive notification of events being published through the event router 120. Events published by a message broker 128 are preferably distributed to a subscribed event proxy server 122, and the event proxy server 122 preferably sends the event to a client. The event proxy server 122 is preferably part of a plurality of event proxy servers 122 that can be automatically scaled. Additionally, an event proxy server preferably manages multiple subscriptions, and may subscribe to multiple message brokers 128. Additionally, a plurality (or series) of event proxy servers 122 may be connected to a single message broker 128 or any suitable device publishing the event for the event router 120. The plurality of event proxy servers 122 functions to increase the volume of subscriptions the event router 120 can manage. A plurality of event proxy servers 122 may alternatively be used with a partitioned message broker 128, multiple message brokers 128, or any suitable configuration. As another variation, an event proxy may have multiple subscriptions (e.g., for different clients) to a message broker 128. This multiple subscriptions may have redundancies. The event proxy server 122 may aggregate the subscriptions for improved system efficiency, as shown in FIG. 10. The event distributor 116, the message brokers 128, and the proxy servers 122 cooperate to increase the subscription capabilities of the event router. The event proxy server 122 additionally functions to perform resource intensive processes such as running an event filter or security policy engine. The event proxy server 122 is preferably a dedicated server for handling event filtering, operating the security policy engine, and/or any suitable CPU intensive tasks.

The event router 120 of the preferred embodiment may additionally include an event filter 124 that functions to selectively pass events to a client. The event filter 124 is preferably operated on an event proxy server 122. Event filters 124 selectively filter the number of events published to a particular subscriber based on account security, event type, contents, and/or any suitable parameter of the event. When a subscriber issues a subscription request, the request preferably contains a set of credentials and more preferably a set of event filters. The event router 120, more preferably the event proxy server 122, first verifies the account ownership via the credentials to determine if the subscriber is authorized to view events for the given account. Once a subscriber's identity is determined, the event router only passes events that are associated with authorized accounts. Preferably, this account-level security preferably limits visibility of events to only the relevant account or accounts, and the event filters are preferably applied after the account-level security. The event proxy server 122 preferably applies the event filters 124 to determine if the event router should publish an event to a given subscriber. The event filter 124 is preferably a type filter or a parameter filter. A type filter preferably filters event details by the type of event such as 'call start', 'call end', 'call error', 'call warning', 'record start', 'record end', 'gather start', 'gather end', 'dial start', 'dial end' and/or any suitable type of event. A parameter filter preferably filters events based on characteristics of the event such as by caller ID, contents of call, time of call, duration of call, area code of call, and/or any suitable characteristic of a call. A parameter filter may additionally filter based on the event (such as which digit was pressed by the caller, the warning message issued by the call router, or the length of a recording). Event filters 124 may be used in a variety of ways. As one example, filters may be configured to subscribe to a particular call. As another example, the filters may be configured to subscribe to all calls to and/or from a given phone number. As yet another example, the filters may be configured to subscribe to a particular telephony application action such as "call start" across an account (which may involve multiple simultaneous calls for various phone numbers). The event filter 124 may additionally function to provide a level of security. The event filter 124 preferably prevents inspection, observation, receiving, and/or gathering of any useful information concerning a subset of events. A publisher may implement a security event filter 124 for events the publisher does not want a subscriber to see or alternatively, any suitable entity may implement a security event filter 124.

The event router 120 of the preferred embodiment may additionally include a security policy engine 126 that functions to enforce a security policy governing which subscribers are allowed to subscribe to a particular event. The event proxy server 122 preferably operates the security policy engine 126. Preferably, the security policy engine 126 includes a signed URL. The signed URL is preferably composed of a subscription message and a verification token. The verification token functions to be validation of the authenticity of the subscription request. A private key shared between the client application developer and the event router is preferably used to generate the verification token and is preferably a code, password, or any suitable identifier. The verification token is preferably implemented as an HMAC (Hash Message Authentication Code) hash using the key, but may alternatively be implemented by any suitable cryptographic message authentication technique. The verification token preferably includes the subscription request including a subscription URL, subscription filters, subscription expiration time, and/or any other suitable subscription metadata or parameter. The verification token is preferably attached to the subscription request. In one preferred version, the verification token is appended to the end of a URL of the subscription message to form the signed URL. The signed URL allows the subscription request to be passed to unknown devices, such as a remote web browser, and allowing the browser to issue subscription requests without knowing the key or other information. Alternatively, other security systems such as OAuth URL signing or any suitable security method may be implemented.

The system of the preferred embodiment may also include a connection to the client device 130, which functions to be a channel through which published events that a client subscribes to can be delivered. The connection 130 is preferably any suitable network connection either wired or wireless. The connection 130 is preferably between an event router 120 and the client, and more preferably, the connection 130 is between an event proxy server 122 and the client. The connection to the client is preferably an HTTP connection but may be any suitable signaling protocol. The client device of the preferred embodiment functions to provide interaction with subscribed events. The client device may be a front-end interface of the web application. The client device preferably reacts to events and provides an interface for user interaction. The client device may be a website, a computer program, a web enabled consumer product, a server, or any suitable device. However, the client device may alternatively be a backend system such as a data collection system. A browser 132 is one common type of client. A connection with a browser is preferably implemented via Ajax in javascript (e.g., XMLHttpRequest) or via a flash plugin (e.g., XMLSocket or an AMF or SecureAMF channel). An Application Programming Interface (API) server 134 is a second common type of client. A client preferably initiates the creation of connection 130 to the event router 122. However, in the situation of an API server 134, the event router 120 or, more preferably, an event proxy server 122 may initiate the creation of a connection 130 to the client 130. There may additionally be a control channel and a publication channel. The control channel is a connection through which a client submits a subscription request. The client can manage subscriptions through the control channel. Management of subscriptions includes modifying an existing subscription (e.g., updating filters or changing expiration time), adding a subscription, deleting a subscription and/or any suitable subscription change. The subscription channel is the connection through which events are sent to the client. In one variation, a client may setup multiple subscriptions and/or modify subscriptions through multiple control channels or alternatively through one control channel at different times. One publication channel is preferably used regardless of the number of subscriptions of a client. This functions to reduce the number of open connection 130 between the client and the event proxy server 122. The connection 130 may be any suitable connection as mentioned above. In the case where the connection is a long poling type connection, a client preferably connects to the event proxy server 122, gets an event, and closes a connection. When the client is not connected, events may be missed by the client. The event proxy server 122 preferably includes a cache to store events (up to an expiration time) and delivers the cached events to the client during the next connection with the client.

The application server 114 of the preferred embodiment functions to provide a web developer with an improved development environment for interfacing and designing interactions for communications applications. The call router 110 preferably manages the interaction between the telephony device(s) 112 and the application server 114. Events are preferably generated by this interaction. The web application (application server) is preferably a website, but may alternatively be a computer program, a web enabled consumer product, or any suitable method or device capable of event subscription tasks. The application server 114 preferably combines telephony actions and a website to form a powerful user experience. In one example of an application server 114, a user may enter a phone number and leave audio comments for individual photos as the photos cycle through a slideshow. In a second example, a conference call can be managed through a web interface. In a third example, a customer service phone call may be managed and annotated using a web interface. In a fourth example, a business or sales phone call may be managed and supported by using a web interface. Any suitable application server utilizing telephony interaction may alternatively be used. The web application is preferably programmed in a manner similar to regular websites, but integration into the system allows for new user experiences relying on telephony actions.

The application server 114 functions to provide data processing logic for requests received from the call router 110. The application server 114 is preferably connected to the call router 110 via a network 24, more preferably via the Internet. The application server 114 is preferably a third party server operated outside of the system, but the system may alternatively include the application server 114. A URI is preferably associated with an application server 114 or an application on an application server 114. The application server 114 preferably communicates with the call router 110 using an application layer protocol, more preferably using the HTTP protocol, or more secure HTTPS protocol. The application server 114 preferably receives HTTP requests from and sends HTTP responses to the call router 110. The application server 114 preferably runs on a standard stack of programming languages, hosting providers, operating systems and databases to handle HTTP requests, as if the caller were a website visitor in a web browser. The application server 114 also preferably verifies the digital signatures of the call data received in the requests using the secret key to compute a cryptographic hash from the received information and the hash received. If the computed hash and the received hash do not match, or no hash is received with the request, then the application server 114 preferably determines the request is fraudulent, and the request is preferably discarded. If the computed hash and received hash match, the application server 114 preferably determines that the request is authentic and proceeds further with the processing of the request. The application server may alternatively choose to ignore the hash if security is not important. The application server preferably uses call state data communicated by the call router request to determine the next call router instructions, without requiring call state stored on the application server. The application server may alternatively use call state data sent by the call router, such as the caller ID of the caller or the unique ID of the call, to reference additional or external state data, such as rows in a database or session data stored on the application server.

The application server 114 preferably responds to HTTP requests received from the call router 110 by generating telephony instructions for the call router 110. Telephony instructions when executed by the call router preferably cause an event to be detected by the call router 110. The application server preferably replies to the call router in XML, however, any suitable machine-readable message format may be used, including HTML, key/value pair text, delimited text or binary encoding. The XML preferably includes the telephony instructions for the call router 110 such as connecting to another number, playing a recorded greeting, reading text, and/or requesting DTMF digit entry from the caller. The telephony instruction may alternatively be related to SMS messaging, Multimedia Messaging Service (MMS) messaging, faxes, instant messages, email, micro-blogging, or any suitable messaging task. The telephony instruction may additionally be used to send an outgoing SMS message, arrange a phone call from a specific phone number, arranging for a callback, setting up a conference call (connecting multiple numbers), sending an email, interfacing with a calendar or scheduling system, purchasing goods, or services, or any other suitable instruction. The XML instructions are preferably a set of commands to be executed in order, one at a time (i.e., sequentially). An example XML response is shown in FIGS. 9A and 9B. In single telephony session (e.g. one initiated by a PSTN-device or an SMS device), a response from an application server can initiate an outgoing telephony call and/or a SMS message. That is, a single XML response preferably provides the ability to interact with both the SMS network and the voice telephony network (PSTN, SIP/VoIP, etc) sequentially or simultaneously. In addition, audio or video files sent to the call router 110 can be converted to text by an automatic speech-to-text engine, human or other technique, and sent back in text form as an SMS message or an attachment to an MMS. In one variation, an application running on a server may be a simple static XML page and static sound files, deployed on basic web servers where no development or scripting environment is available. This variation preferably uses URI Templates (a current IETF proposal for HTML5), which essentially includes URLs with placeholders for variable data, like this: http://www.twilio.com/audio/{Digit}.mp3 where the call router 110 would substitute the digits pressed for the {Digit} placeholder in the URI Template, GET the file at the resulting URI, and play the static sound file in response. This allows an entire application to be authored offline in a What-You-See-Is-What-You-Get (WYSIWYG) html editor. For example, if the server response specifies the URI Template: http://demo.twilio.com/myapp/{Digits}.mp3, and the caller presses digits 1234, the call router 110 would GET the static mp3 file located at: http://demo.twilio.com/myapp/1234.mp3 and play it to the caller. The variables used for substitution in the URI Templates preferably correspond to the names of variables defined for state submission in HTTP GET, POST and/or header requests from the call router. From the previous example, {Digits} would be associated with a parameter named "Digits" that is preferably generated as a result of a "gather" telephony instruction (collection of DTMF digits). In the preferred embodiment for the second configuration, the call is initiated by the application server 114 (through the call router 110), and the second configuration is substantially similar to the first configuration, such that the call routing is preferably handled identically to an incoming call, namely via URI requests from call router 110 to the server 114 upon call state changes.

Figure 7:
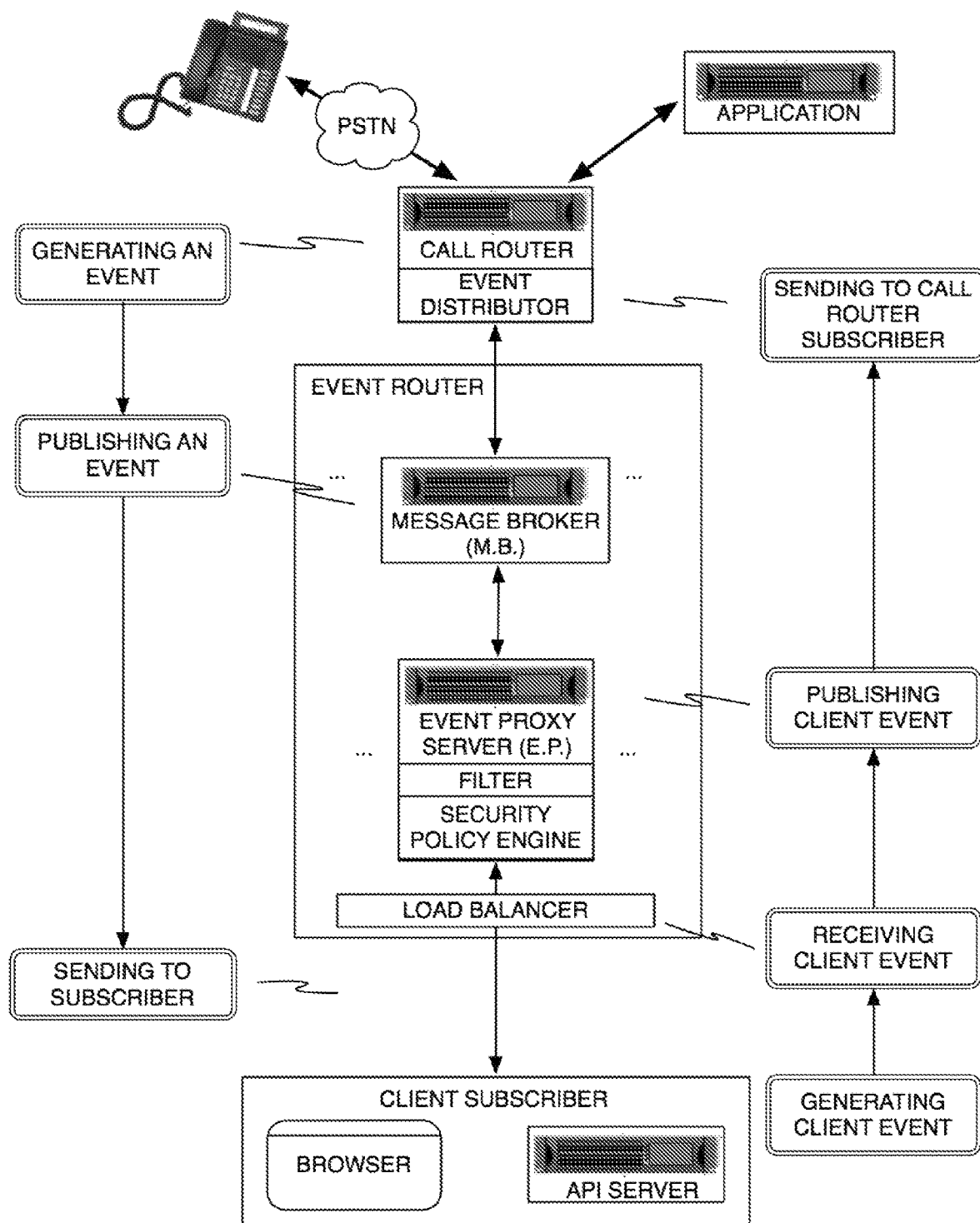
FIG. 7 is a flowchart diagram of a preferred method full duplex publishing and subscribing of events.

As an additional alternative, the system may be implemented to be full duplex where events (client events) may additionally be published from a client and the call router can subscribe to the client events as shown in FIG. 7. In this alternative, the event router additionally manages the publication of client events and manages call router subscriptions to client events. The system is preferably implemented in substantially the same way as above, but with the client additionally generating events and the call router subscribing to events. The client event system is preferably integrated with the eventing system described above.

2. Telephony Web Event Method

As shown in FIGS. 3-6, the method of event subscription for telephony applications includes distributing events S100 and subscribing to events S200. Distributing events preferably includes the sub-steps publishing an event to a router S110, identifying subscribers to an event S120, and sending an event to a subscriber S130. Subscribing to events includes the sub-steps of generating a signed URL for an event subscription S210, sending an event subscription request to an event router S220, verifying an event subscription S230, and allowing an event subscription S240. The method may additionally include allocating new resources to the event router. In particular event proxy servers and message brokers may be allocated or deallocated. Additionally, call routers, event distributors, and/or any suitable part device of the system may be allocated or scaled to accommodate capacity needs. A load balancer may additionally distribute processing across the plurality of components.

As an alternative, the method may additionally include receiving a subscriber generated client event, publishing the client event to the event router and identifying a call router subscribed to a client event, and sending the client event to the call router. This functions to make the eventing method full duplex for two way event publication and subscription. The duplex eventing system is substantially similar to the eventing system described, but where the client generates the events and the call router is subscribed to the events.

2A. Method of Publishing an Event

Step S110, which includes publishing an event to a router, functions to initiate the announcement of an event. Event details are preferably sent to an event router at a URL or other suitable resource or connection identifier. Event details preferably include account identification, event type, any event data associated with the event, and any other suitable parameters relating to the event. Publishing to a router preferably occurs after a new event occurs, but alternatively, a batch of events may be published periodically, a batch of events may be published when an event count is satisfied, an event may be published when an event type is satisfied, or any suitable event publishing rule may be applied. An event is preferably generated from a telephony application operating on a call router. The telephony application is preferably substantially similar in functionality to the one described above. A call router preferably publishes an event to an event router. The event is preferably published over HTTP, but any suitable protocol may be used. An event distributor may additionally select a message broker to send the event. A plurality of message brokers may be sharded according to event types and the event distributor preferably is capable of mapping the event to the appropriate message broker.

Step S120, which includes identifying subscribers to an event, functions to identify all authorized subscribers that should be notified that the event occurred. The subscribers are preferably associated with a subscription URL. Any suitable number of subscribers is preferably identified, and subscribers are preferably identified by inspecting a list of subscribers. The subscribers may alternatively be associated with a group of other subscribers, and a group (or groups) may be identified as a subscriber. Identifying subscribers is preferably performed by an event router, and more preferably an event proxy server in cooperation with a message broker, though any suitable device may be used. Preferably, an event proxy server performs the steps of managing a subscription of a client (subscriber) and subscribing to an event publication of the event router. The event proxy server preferably subscribes on behalf of a client, so that subscription processing can be delegated to the event proxy server. More preferably a message broker performs the steps of publishing the event. So that the event proxy server subscribes to a message broker. Identifying subscribers of an event may include a sub-step of verifying event filters. An account-level security may additionally be enforced by the event router to limit the visibility of events to only relevant accounts. The event is compared to filters of a subscriber to ensure the subscriber should be sent the event. The filters are preferably type filters or parameter filters as discussed above.

Step S130, which includes publishing an event to a subscriber, functions to notify a subscriber of the occurrence of an event. The event is preferably published by an event router over an open HTTP connection, but alternatively, a periodic HTTP connection, messaging framework such as Jabber, or any suitable communication protocol may be used. In the situation where a client has previously broken a connection with the event router (i.e., is not connected to the event router at the time an event occurs), the event proxy server preferably establishes a connection to the subscriber. The event proxy server preferably establishes the connection by accessing the stored address of the client and connecting through any suitable protocol. In the case the subscriber is an API server, an API command may be used to connect or notify the API server of the event.

2B. A Method of Subscribing to an Event

Step S210, which includes generating a signed URL for an event subscription, functions to generate a URL encoding any subscription URL, filter, and/or identification information. An unsigned URL is preferably generated including account identification, subscription URL, subscription filters, subscription expiration time, and/or any other suitable subscription metadata or parameter. Preferably, a key is looked up based on the account identification. The key is used to create a verification token. The verification token is preferably implemented as an HMAC-SHA1 (Hash Message Authentication Code) hash using the key or any suitable another cryptographic message authentication technique may be used. The verification token additionally includes the subscription request including a subscription URL, subscription filters, subscription expiration time, and/or any other suitable subscription metadata or parameter. The verification token is preferably appended to the unsigned URL to form a signed URL. The signed URL is preferably integrated into a subscription request. The subscription request is preferably a request to receive particular events of a telephony application.

Step S220 includes sending a subscription request to an event router. The subscription request is preferably sent to an event router by HTTP protocol, but any suitable protocol may alternatively be used. The subscription request is preferably received by an event router, and more preferably is received by an event proxy server. The event proxy server preferably manages subscriptions.

Step S230, which includes verifying an event subscription, functions to verify the identity of a subscriber. The signed URL of the event is preferably deconstructed to identify account identification, subscription URL, subscription filters, subscription expiration time, and/or any other suitable subscription metadata or parameter. The event router preferably verifies that the account identification is included in the signed URL or other authentication credentials. If no account identification is found, the subscription request is discarded and an error is returned. If the identification information is included a key for the account is looked up (i.e. found in a database). The key is preferably a shared key that is identical to the key of Step S210. The key is then used to form a verification token. The verification token is preferably a HMAC hash, or alternatively any suitable cryptographic message or identifier. The verification token is compared to the verification token from the signed URL to verify the match.

Step S240, which includes allowing an event subscription, functions to allow a client to subscribe to an event. A subscription preferably allows a client to receive events in real time (approximately a few milliseconds to a few seconds). An event subscription also only allows events that are authorized to be viewed by the account, such as events generated by calls on that account. More preferably, the events preferably pass any filters of a subscriber. As an additional alternative, subscriptions may expire after a given time. As part of Step S240, the method includes the event proxy server (or event router) configuring filters for the subscription. This step functions to setup processing operations of the subscription. Additionally, any suitable subscription setup that must be performed is additionally performed. In the variation where the subscriber previously has a subscription, the previous subscription may be modified to include the new subscription details. Events from multiple subscriptions of one subscriber are preferably sent to the subscriber through a single connection as described above. In the situation where a subscriber is not connected to the event router when an event occurs the event proxy server or any suitable device may queue or cache the events for delivery when the subscriber next establishes a connection.

As a person skilled in the art will recognize from the previous detailed description and from the figures and claims, modifications and changes can be made to the preferred embodiments of the invention without departing from the scope of this invention defined in the following claims.

We claim:

1. A method comprising:
   detecting, at a first system and via a network, an event generated on a second system, the event having an event type;
   based on the event type, selecting a message broker of a plurality of message brokers;
   providing the event to the selected message broker;

receiving, at the first system and via the network, a connection from a client device; and in response to receiving the connection from the client device and based on the event type, providing the event from the message broker to the client device.

2. The method of claim 1, further comprising:

after detecting the event and before receiving the connection from the client device, storing the event in a cache up to an expiration time.

3. The method of claim 1, wherein the event is a communication event.

4. The method of claim 1, further comprising:

receiving, before detecting the event, a subscription request from the client device, the subscription request comprising an identification of an account;

wherein:

the event is associated with the account; and the providing of the event from the message broker to the client device is further based on the account being identified in the subscription request and the event being associated with the account.

5. The method of claim 4, further comprising:

establishing, in response to receiving the subscription request, a subscription for events associated with the event type.

6. The method of claim 4, wherein:

the subscription request comprises a parameter filter comprising an identification of a characteristic of the event.

7. The method of claim 4, wherein:

the subscription request is received using an application programming interface (API).

8. The method of claim 1, wherein:

the client device has permission to receive information for the event type.

9. The method of claim 1, wherein the plurality of message brokers are sharded according to one or more event types.

10. A system comprising:

a memory that stores instructions; and one or more processors configured by the instructions to perform operations comprising:

detecting, via a network, an event generated on another system, the event having an event type;

based on the event type, selecting a message broker of a plurality of message brokers;

providing the event to the selected message broker;

receiving, via the network, a connection from a client device; and in response to the connection from the client device and based on the event type, providing the event from the message broker to the client device.

11. The system of claim 10, wherein the operations further comprise:

after detecting the event and before receiving the connection from the client device, storing the event in a cache up to an expiration time.

12. The system of claim 10, wherein the event is a communication event.

13. The system of claim 10, wherein:

the operations further comprise receiving, before the detecting of the event, a subscription request from the client device, the subscription request comprising an identification of an account;

the event is associated with the account; and the providing of the event to the client device is further based on the account being identified in the subscription request and the event being associated with the account.

14. The system of claim 13, wherein the operations further comprise:

establishing, in response to the subscription request, a subscription for events associated with the event type.

15. The system of claim 13, wherein:

the subscription request comprises a parameter filter comprising an identification of a characteristic of the event.

16. The system of claim 13, wherein:

the subscription request is received using an application programming interface (API).

17. A non-transitory machine-readable medium that stores instructions that, when executed by one or more processors of a system, cause the system to perform operations comprising:

detecting, via a network, an event generated on another system, the event having an event type;

based on the event type, selecting a message broker of a plurality of message brokers;

providing the event to the selected message broker;

receiving, via the network, a connection from a client device; and in response to the connection from the client device and based on the event type, providing the event from the message broker to the client device.

18. The machine-readable medium of claim 17, wherein the operations further comprise:

after detecting the event and before receiving the connection from the client device, storing the event in a cache up to an expiration time.

19. The machine-readable medium of claim 17, wherein the event is a communication event.

20. The machine-readable medium of claim 17, wherein:

the operations further comprise receiving, before the detecting of the event, a subscription request from the client device, the subscription request comprising an identification of an account;

the event is associated with the account; and the providing of the event to the client device is further based on the account being identified in the subscription request and the event being associated with the account.

* * * * *

UNITED STATES PATENT AND TRADEMARK OFFICE
CERTIFICATE OF CORRECTION

PATENT NO. : 11,665,285 B2
APPLICATION NO. : 17/301335
DATED : May 30, 2023
INVENTOR(S) : Lawson et al.

It is certified that error appears in the above-identified patent and that said Letters Patent is hereby corrected as shown below:

On the Title Page

On page 6, in Column 1, under "U.S. Patent Documents", Line 4, delete "2009/0022131" and insert --2009/0221310-- therefor On page 6, in Column 1, under "U.S. Patent Documents", Line 51, delete "2010/0029191" and insert --2010/0291910-- therefor On page 6, in Column 1, under "U.S. Patent Documents", Line 67, delete "2011/0014981" and insert --2011/0149810-- therefor On page 6, in Column 2, under "U.S. Patent Documents", Line 43, delete "2012/0017361" and insert --2012/0173610-- therefor On page 7, in Column 1, under "U.S. Patent Documents", Line 40, delete "2014/0037251" and insert --2014/0372510-- therefor Signed and Sealed this
Twenty-fourth Day of September, 2024

Katherine Kelly Vidal
*Director of the United States Patent and Trademark Office*